United States Patent [19]

Onan et al.

[11] Patent Number: 6,069,117
[45] Date of Patent: May 30, 2000

[54] FOAMED RESIN COMPOSITIONS FOR SEALING SUBTERRANEAN ZONES

[75] Inventors: David D. Onan; Jiten Chatterji, both of Duncan; Roger S. Cromwell, Walters, all of Okla.

[73] Assignee: Halliburton Energy Services, Inc., Duncan, Okla.

[21] Appl. No.: 09/372,152

[22] Filed: Aug. 20, 1999

Related U.S. Application Data

[62] Division of application No. 09/024,596, Feb. 17, 1998, Pat. No. 6,006,835.

[51] Int. Cl.$^7$ .............................. C09K 3/00; B01F 17/00
[52] U.S. Cl. ............................. 507/202; 507/205; 516/12
[58] Field of Search ................................. 507/102, 202, 507/105, 205; 166/309, 305.1, 295; 516/12

[56] References Cited

U.S. PATENT DOCUMENTS

| | | | |
|---|---|---|---|
| 2,815,079 | 12/1957 | Goins, Jr. et al. | 166/29 |
| 3,082,823 | 3/1963 | Hower et al. | 166/29 |
| 3,208,525 | 9/1965 | Caldwell et al. | 166/33 |
| 3,310,111 | 3/1967 | Pavlich et al. | 166/33 |
| 3,416,604 | 12/1968 | Rensvold et al. | 166/33 |
| 3,467,208 | 9/1969 | Kelly, Jr. et al. | 175/72 |
| 3,612,181 | 10/1971 | Brooks, Jr. | 166/295 |
| 3,750,768 | 8/1973 | Suman, Jr. et al. | 175/72 |
| 3,782,466 | 1/1974 | Lawson et al. | 166/254 |
| 3,894,977 | 7/1975 | Brown et al. | 260/18 EP |
| 3,933,204 | 1/1976 | Knapp | 166/295 |
| 3,960,801 | 6/1976 | Cole et al. | 260/33.6 EP |
| 3,976,135 | 8/1976 | Anderson | 166/276 |
| 4,042,031 | 8/1977 | Knapp | 166/276 |
| 4,042,032 | 8/1977 | Anderson et al. | 166/276 |
| 4,072,194 | 2/1978 | Cole et al. | 166/295 |
| 4,101,474 | 7/1978 | Copeland et al. | 260/13 |
| 4,113,015 | 9/1978 | Meijs | 166/295 |
| 4,127,173 | 11/1978 | Watkins et al. | 166/276 |
| 4,189,002 | 2/1980 | Martin | 166/295 |
| 4,199,484 | 4/1980 | Murphey | 260/13 |
| 4,215,001 | 7/1980 | Elphingstone et al. | 252/8.55 C |
| 4,216,829 | 8/1980 | Murphey | 166/276 |
| 4,220,566 | 9/1980 | Constein et al. | 260/13 |
| 4,272,384 | 6/1981 | Martin | 252/8.55 R |
| 4,336,842 | 6/1982 | Graham et al. | 166/276 |
| 4,339,000 | 7/1982 | Cronmiller | 166/295 |
| 4,368,136 | 1/1983 | Murphey | 252/316 |
| 4,483,888 | 11/1984 | Wu | 427/336 |
| 4,489,785 | 12/1984 | Cole | 166/295 |
| 4,558,075 | 12/1985 | Suss et al. | 523/216 |
| 4,620,993 | 11/1986 | Suss et al. | 427/407.1 |
| 4,665,988 | 5/1987 | Murphey et al. | 166/295 |
| 4,741,401 | 5/1988 | Walles et al. | 166/300 |
| 4,773,482 | 9/1988 | Allison | 166/270 |
| 4,785,884 | 11/1988 | Armbruster | 166/280 |
| 4,829,100 | 5/1989 | Murphey et al. | 523/131 |
| 4,921,047 | 5/1990 | Summers et al. | 166/276 |
| 4,972,906 | 11/1990 | McDaniel | 166/276 |
| 5,074,358 | 12/1991 | Rendall et al. | 507/202 |
| 5,090,478 | 2/1992 | Summers | 166/278 |
| 5,095,987 | 3/1992 | Weaver et al. | 166/276 |
| 5,133,409 | 7/1992 | Bour et al. | 166/293 |
| 5,159,980 | 11/1992 | Onan et al. | 166/294 |
| 5,168,928 | 12/1992 | Terry et al. | 166/292 |
| 5,211,234 | 5/1993 | Floyd | 166/276 |
| 5,213,161 | 5/1993 | King et al. | 166/293 |
| 5,232,961 | 8/1993 | Murphey et al. | 523/414 |
| 5,293,938 | 3/1994 | Onan et al. | 166/293 |
| 5,314,023 | 5/1994 | Dartez et al. | 166/295 |
| 5,325,723 | 7/1994 | Meadows et al. | 73/794 |
| 5,335,726 | 8/1994 | Rodrigues | 166/294 |
| 5,337,824 | 8/1994 | Cowan | 166/293 |
| 5,358,044 | 10/1994 | Hale et al. | 166/293 |
| 5,358,051 | 10/1994 | Rodrigues | 166/295 |
| 5,361,841 | 11/1994 | Hale et al. | 175/65 |
| 5,361,842 | 11/1994 | Hale et al. | 166/293 |
| 5,363,918 | 11/1994 | Cowan et al. | 166/295 |
| 5,368,102 | 11/1994 | Dewprashad et al. | 166/276 |
| 5,373,901 | 12/1994 | Norman et al. | 166/300 |
| 5,377,757 | 1/1995 | Ng | 166/277 |
| 5,388,648 | 2/1995 | Jordan, Jr. | 166/380 |
| 5,428,178 | 6/1995 | Zuzich et al. | 549/378 |
| 5,458,195 | 10/1995 | Totten et al. | 166/293 |
| 5,547,027 | 8/1996 | Chan et al. | 166/295 |
| 5,559,086 | 9/1996 | Dewprashad et al. | 507/219 |
| 5,692,566 | 12/1997 | Surles | 166/295 |
| 5,873,413 | 2/1999 | Chatterji et al. | 166/293 |
| 5,875,844 | 3/1999 | Chatterji et al. | 166/293 |
| 5,875,845 | 3/1999 | Chatterji et al. | 166/293 |
| 5,875,846 | 3/1999 | Chatterji et al. | 166/293 |
| 5,911,282 | 6/1999 | Onan et al. | 175/72 |
| 5,913,364 | 6/1999 | Sweatman | 166/281 |
| 5,957,204 | 9/1999 | Chatterji et al. | 166/295 |
| 5,969,006 | 10/1999 | Onan et al. | 523/166 |
| 6,006,835 | 12/1999 | Onan et al. | 166/295 |
| 6,006,836 | 12/1999 | Chatterji et al. | 166/295 |

FOREIGN PATENT DOCUMENTS

| | | | |
|---|---|---|---|
| 0 553 566 A1 | 8/1993 | European Pat. Off. | E21B 43/04 |
| 0 802 253 A1 | 10/1997 | European Pat. Off. | E21B 33/13 |
| 1315462 | 12/1962 | France . | |
| 1019122 | 2/1966 | United Kingdom . | |
| WO 91/02703 | 3/1991 | WIPO | C04B 24/24 |
| WO 94/12445 | 6/1994 | WIPO | C04B 26/18 |

*Primary Examiner*—Philip Tucker
*Attorney, Agent, or Firm*—Craig W. Roddy

[57] ABSTRACT

The present invention provides improved foamed hardenable epoxy resin sealing compositions and methods which are particularly useful in the construction and repair of wells. The foamed epoxy resin compositions are corrosion resistant and have improved mechanical properties including elasticity and ductility.

28 Claims, No Drawings

FOAMED RESIN COMPOSITIONS FOR SEALING SUBTERRANEAN ZONES

RELATED U.S. APPLICATION DATA

This is a divisional of application Ser. No. 09/024,596 filed on Feb. 17, 1998, now U.S. Pat. No. 6,006,835.

BACKGROUND OF THE INVENTION

1. Field of the Invention

The present invention relates generally to sealing subterranean zones penetrated by well bores, and more particularly, to foamed epoxy resin compositions which set into corrosion resistant highly resilient solid masses and methods of using the compositions in the construction and repair of wells.

2. Description of the Prior Art

Hydraulic cement compositions are commonly utilized as sealants in subterranean well construction and repair procedures. For example, hydraulic cement compositions are used in primary sealing operations whereby strings of pipe such as casing and liners are sealed in well bores. In performing primary cementing, a hydraulic cement composition is pumped into the annular space between the walls of the well bore and the exterior surfaces of pipe disposed therein. The cement composition is permitted to set in the annular space thereby forming an annular sheath of hardened substantially impermeable cement therein. The cement sheath physically supports and positions the pipe in the well bore and bonds the exterior surfaces of the pipe to the walls of the well bore whereby the undesirable migration of fluids between zones or formations penetrated by the well bore is prevented.

The development of wells including one or more laterals to increase production has recently taken place. Such multi-lateral wells include vertical or deviated principle well bores having one or more ancillary laterally extending well bores connected thereto. Each of the lateral well bores can include a liner sealed therein which is tied into the principle well bore. The lateral well bores can be vertical or deviated and can be drilled into predetermined producing formations or zones at any time in the productive life cycle of the well.

When conventional cement compositions are utilized for sealing casing or liners in well bores, they set into brittle solid masses which often do not have sufficient resiliency, i.e., elasticity and ductility, to resist loss of pipe or formation bond, cracking and/or shattering as a result of pipe movements caused by expansion, contraction, impacts or shocks. The bond loss, cracking or shattering of the set cement allows leakage of formation fluids through at least portions of the well bore or bores by way of the annuluses therein which can be highly detrimental.

Hardenable epoxy resin compositions have heretofore been used for sealing subterranean zones penetrated by well bores when the zones contain corrosive fluids. For example, waste fluids such as salt water, acidic materials, caustic materials, organic materials, chemical by-product materials, and the like are often disposed of by injecting them into disposal wells. Such disposal wells penetrate subterranean formations which accept large volumes of waste and are naturally separated from other subterranean formations. When a disposal well or other well containing corrosive fluids is completed in the conventional manner whereby a string of steel pipe is cemented in the well bore utilizing a hydraulic cement slurry, both the cement and steel casing are often subjected to severe corrosion. A result of such corrosion in disposal wells can be that the liquid waste materials leak into and contaminate formations containing useful fluids such as hydrocarbons or potable water. In other wells where hydrocarbons are produced along with corrosive fluids, the corrosion can result in leakage of fluids between formations and/or to the surface.

In order to prevent the corrosion of metal pipe strings and insulate them from corrosive fluids, it has heretofore been the practice to seal the pipe strings in well bores with a hardenable epoxy resin composition. Epoxy resin compositions are highly resistent to degradation by acids and other corrosive fluids and their use ensures that the corrosive fluids do not find their way to the surface or into subterranean locations containing useful recoverable fluids. However, like set cement compositions, hardened epoxy resin compositions often have not had sufficient elasticity to resist failure as a result of pipe movements.

Thus, there are needs for improved hardenable sealing compositions for use in the construction and repair of wells whereby the sealing compositions are corrosion resistant and also have sufficient resiliency to resist failure caused by pipe movements.

SUMMARY OF THE INVENTION

The present invention provides improved hardenable corrosion resistant sealing compositions having elasticity and ductility and methods of utilizing such compositions which meet the needs described above and overcome the deficiencies of the prior art. The compositions o this invention are basically comprised of an epoxy resin comprised of the condensation reaction product of epichlorohydrin and bisphenol A, a hydrocarbon diluent containing one or more aromatic hydrocarbons, a plastic fixer such as N-β-aminoethyl-Γ-aminopropyltrimethoxysilane, a hardening agent such as 2-ethyl-4-methyl imidazole, a foaming agent comprising a fluorocarbon surfactant and a compressible gas present in an amount sufficient to foam the composition.

The methods of the present invention basically comprise the steps of preparing a foamed hardenable epoxy resin sealing composition as described above, pumping the foamed composition into a subterranean zone penetrated by a well bore and allowing the foamed composition to harden in the subterranean zone.

It is, therefore, a general object of the present invention to provide improved hardenable sealing compositions which are both corrosion resistant and resilient and methods of using such compositions in wells.

Other and further objects, features and advantages of the present invention will be readily apparent to those skilled in the art upon a reading of the description of preferred embodiments which follows.

DESCRIPTION OF PREFERRED EMBODIMENTS

The present invention provides improved epoxy resin well sealing compositions which upon hardening are corrosion resistant and resilient and methods of utilizing the compositions in wells. While the compositions and methods are useful in a variety of well completion and remedial operations, they are particularly useful in primary sealing procedures, i.e., sealing strings of pipe such as casing and liners in well bores. When such casing and liners are sealed in well bores utilizing the compositions and methods of this invention, if corrosive fluids come into contact with the hardened sealant, e.g., corrosive fluids introduced into disposal wells or corrosive fluids produced in oil and gas wells such as by the subterranean contact of acid gases ($CO_2$ and $H_2S$) with water, the sealant resists corrosion. Also, because the hardened sealant is highly resilient, it does not readily fail as a result of pipe movements due to expansion, contraction, impacts or shocks.

The improved sealing compositions are basically comprised of a liquid epoxy resin, an aromatic diluent for lowering the viscosity of the epoxy resin, a plastic fixer for enhancing the coating and bonding of the epoxy resin to metal pipe surfaces and subterranean formation surfaces, a hardening agent for causing the epoxy resin composition to harden, an effective amount of a fluorocarbon surfactant foaming agent and a compressible gas present in an amount sufficient to foam the composition. The compositions preferably also include a filler such as particulate crystalline silica to improve their strength and resiliency.

Epoxy resins produced from epichlorohydrin and bisphenol A (4,4'-isopropylidenediphenol) are readily available and are particularly suitable for producing a pumpable resin composition which hardens into an impermeable, high strength solid. Particularly suitable such epoxy resins are liquids having molecular weights in the range of from about 200 to about 1000 and having a one gram equivalent of epoxide per about 100 to 200 grams of the epoxy resin. A more preferred such epoxy resin has a molecular weight of about 340, a one gram equivalent of epoxide per about 185 to 192 grams of resin and a viscosity at 25° C. of about 100 to 160 poises. A liquid epoxy resin having the foregoing properties is commercially available under the tradename "EPON 828™" from Shell Chemical Co. of Houston, Tex.

A liquid diluent containing one or more aromatic hydrocarbons is included in the epoxy resin composition so that the composition will have a viscosity low enough to be pumpable. While a variety of diluents containing aromatic hydrocarbons can be utilized, preferred such diluents are those containing aromatic hydrocarbons having the formula $$C_6H_2(R)_4$$

wherein R is hydrogen or a straight or a branched chain alkyl radical having from 1 to 3 carbon atoms. At least two of the Rs are preferably alkyl radicals.

Examples of such aromatic hydrocarbons include, but are not limited to, toluene, ethylbenzene, n-propylbenzene; isopropylbenzene, n-butylbenzene, isobutylbenzene, cyclohexylbenzene, n-hexylbenzene, xylene, diethylbenzene, 2-chloro-p-xylene diisopropylbenzene, 2-nitro-p-xylene, cymene, durene, isodurene, trimethylbenzene, triethylbenzene, dibutylbenzene, pentamethylbenzene, 1-pentyl-3-ethylbenzene, p-pentyltoluene, 1-hexyl-3-isobutylbenzene, m-hexyltoluene, 1-heptyl-3-isopropylbenzene, p-heptyltoluene, 1-heptyl-3-ethylbenzene, 1-octyl-3-butylbenzene, 1-octyl-3-propylbenzene, p-octyltoluene, 1-nonyl-3-ethylbenzene, p-nonyltoluene, 1-dodecyl-3-ethylbenzene, p-isodecyltoluene, 1-decyl-3-isotridecylbenzene and mixtures thereof.

A particularly suitable diluent which is presently preferred is comprised of a mixture of hydrocarbons containing from about 50% to about 99% of one or more of the above described aromatic hydrocarbons by weight of the diluent. Such a preferred diluent is commercially available under the tradename "CYCLO SOL 63™" from Shell Chemical Co. of Houston, Tex.

The liquid hydrocarbon diluent utilized is generally included in the epoxy resin composition in an amount in the range of from about 25% to about 50% by weight of epoxy resin in the composition. More preferably, the diluent is included in the epoxy resin composition in an amount of about 27% by weight of the epoxy resin therein.

The plastic fixer for enhancing the bonding strength of the epoxy resin composition is preferably selected from the group of N-β-aminoethyl-Γ-aminopropyltrimethoxysilane, Γ-aminopropyltriethoxysilane and Γ-aminopropyltrimethoxysilane. Of these N-β-aminoethyl-Γ-aminopropyltrimethoxysilane is preferred which is commercially available under the tradename "SILANE A1120™" from the Union Carbide Corp. of Charleston, W. Va.

The plastic fixer utilized is generally present in the composition in an amount in the range of from about 0.01% to about 5% by weight of epoxy resin therein, most preferably about 0.65%.

A variety of hardening agents can be used which will cause an epoxy resin of the type described above to harden into a solid impermeable mass. Such hardening agents include, but are not limited to, aliphatic amines such as diethylaminopropylamine, cycloaliphatic amines such as isophrone diamine, imidazoles, tertiary amines such as benzyldimethylamine, aromatic amines such as metaphenylenediamine and carboxylic acid anhydrides. Carboxylic acid anhydride hardeners include, but are not limited to, phthalic anhydride, methyltetraphthalic anhydride, hexahydrophthalic anhydride and mixtures thereof.

The most preferred hardening agent is 2-ethyl-4-methyl imidazole.

The hardening agent utilized is generally included in the epoxy resin composition in an amount in the range of from about 57% to about 60% by weight of epoxy resin in the composition, more preferably in an amount of about 58% by weight of epoxy resin.

An effective amount of a foaming agent comprised of a fluorocarbon surfactant is also included in the epoxy resin composition. It has been found that fluorocarbon surfactant foaming agents do not adversely react with epoxy resin compositions as do most other foaming agents. That is, most other foaming agents do not form stable foam. Preferred such fluorocarbon surfactant foaming agents are fluorinated alkyl alkoxylates, fluorinated alkyl esters, fluorinated aliphatic polymeric esters. Of these, fluorinated aliphatic polymeric esters are preferred. Such a fluorocarbon surfactant is commercially available under the tradename "FC-430™" from the 3M Co. of St. Paul, Minn.

The fluorocarbon surfactant foaming agent is included in the composition in an amount which is effective to produce a foam, generally an amount in the range of from about 1% to about 12% by weight of epoxy resin therein.

Any compressive gas which does not adversely react with or otherwise affect the other components of the sealing composition or its use can be utilized in accordance with the present invention. Preferably, the compressible gas utilized is selected from air and nitrogen, with nitrogen being preferred.

The compressible gas is included in the composition in an amount sufficient to foam the composition and produce a density in the range of from about 6 to about 16 pounds per gallon.

When a filler is utilized in the epoxy resin composition, it is preferably selected from the group of crystalline silica having a particle size in the range of from about 10 to about 20 microns, barite, calcium carbonate, amorphous silica and iron oxide having a particle size in the range of from about 2 to about 4 microns. Of these, the particulate crystalline silica is preferred.

The filler used is generally included in the epoxy resin composition in an amount in the range of from about 10 to about 200% by weight of epoxy resin therein, preferably in an amount of about 150%.

A preferred corrosion resistant hardenable sealing composition of the present invention which has flexibility, i.e., elasticity and ductility, includes an epoxy resin comprised of the condensation reaction product of epichlorohydrin and bisphenol A; a hydrocarbon diluent containing one or more aromatic hydrocarbons having the formula $$C_6H_2(R)_4$$

wherein R is hydrogen or a straight or branched chain alkyl radical having from 1 to 3 carbon atoms with at least two of the Rs being alkyl radicals, the diluent being present in an amount in the range of from about 25% to about 50% by weight of epoxy resin in the composition; a plastic fixer selected from the group of N-β-aminoethyl-Γ-aminopropyltrimethoxysilane, Γ-aminopropyltriethoxysilane and Γ-aminopropyltrimethoxysilane present in an amount in the range of from about 0.01 to about 5% by weight of epoxy resin in the composition; a hardening agent selected from the group of aliphatic amines, cycloaliphatic amines, imidazoles, tertiary amines, aromatic amines and carboxylic acid anhydrides present in an amount in the range of from about 25% to about 70% by weight of epoxy resin in the composition; an effective amount of a foaming agent comprising a fluorocarbon surfactant selected from the group of fluorinated alkyl alkoxylates, fluorinated alkyl esters and fluorinated aliphatic polymeric esters; and a compressible gas present in an amount sufficient to foam said composition and produce a density in the range of from about 6 to about 16 pounds per gallon.

As mentioned, the sealing composition of the present invention preferably also includes a filler selected from the group of crystalline silica having a particle size in the range of from about 10 to about 20 microns, barite, calcium carbonate amorphous silica and iron oxide having a particle size in the range of from about 2 to about 4 microns present in an amount in the range of from about 10% to about 200% by weight of epoxy resin in the composition.

A more preferred composition of this invention is comprised of an epoxy resin comprised of the condensation reaction product of epichlorohydrin and bisphenol A having a molecular weight of about 340 and a one gram equivalent of epoxide per about 185 to about 192 grams of resin and a viscosity at 25° C. of about 100 to 160 poises; a hydrocarbon diluent containing from about 50% to about 99% aromatic hydrocarbons by weight of the diluent present in an amount of about 27% by weight of the epoxy resin in the composition; a plastic fixer comprised of N-β-aminoethyl-Γ-aminopropyltrimethoxysilane present in an amount of 0.65% by weight of epoxy resin in the composition; a hardening agent comprising 2-ethyl-4-methyl imidazole present in an amount of about 58% by weight of the epoxy resin in the composition; crystalline silica having a particle size in the range of from about 10 to about 20 microns present in an amount of about 100% by weight of epoxy resin in the composition; an effective amount of a fluorocarbon surfactant foaming agent comprising a fluorinated aliphatic polymeric ester; and a compressible gas present in an amount sufficient to foam the composition and produce a density in the range of from about 6 to about 16 pounds per gallon.

The methods of the present invention for performing completion and remedial procedures in a subterranean zone penetrated by a well bore basically comprise the steps of preparing a foamed hardenable sealing composition of this invention, pumping the foamed composition into the subterranean zone and then allowing the foamed composition to harden in the zone.

The methods of the invention are particularly suitable for sealing a pipe string in a well bore penetrating a subterranean zone containing corrosive fluids whereby the hardened sealant can withstand the effects of the corrosive fluids as well as pipe movements, impacts and shocks. The methods comprise the steps of introducing a foamed hardenable epoxy resin sealing composition of this invention which hardens into a solid mass having elasticity and ductility into the annulus between the pipe string and the walls of the well bore, and allowing the epoxy resin composition to harden in the annulus.

In order to further illustrate the compositions and methods of the present invention, the following example is given.

EXAMPLE

An unfoamed epoxy resin composition was prepared by adding 429 grams of a mixture of the condensation reaction product of epichlorohydrin and bisphenol A (Shell Chemical Co. "EPON 828™") and a hydrocarbon diluent containing aromatic compounds (Shell Chemical Co. "CYCLO SOL 63™"). The mixture contained about 67.2% by volume epoxy resin and about 32.8% by volume hydrocarbon diluent. To the diluted epoxy resin, 20.25 grams of a plastic fixer comprised of N-β-aminoethyl-Γ-aminopropyl-trimethoxysilane (Union Carbide "SILANE A-1120™"), 62.5 grams of 2-ethyl, 4-methyl imidazole hardening agent and 500 grams of crystalline silica were added, and the mixture was vigorously stirred. Portions of the resulting mixture were removed and tested for density, thickening time, compressive strength, tensile strength and permeability, all in accordance with the *API Specification for Materials and Testing For Well Cements*, API Specification 10, 5th edition, dated Jul. 1, 1990 of the American Petroleum Institute. To the remaining mixture, 25.58 grams of a fluorocarbon surfactant foaming agent comprised of fluronated aliphatic polymeric ester (3M "FC-430™") were added with stirring. Thereafter, 1123 grams of the resulting mixture were transferred to an atmospheric foam generator. The foam generator was operated for 35 seconds after which portions of the foamed epoxy resin composition generated were tested as described above. The foaming agent concentration was thereafter incrementally increased and portions of the foam generated after each increase were tested. The results of the tests are shown in the Table below.

TABLE

PROPERTIES OF UNFOAMED AND FOAMED COMPOSITIONS

| Quantity of Foaming Agent | Density of | Thickening | 72 hr. Compressive | 72 hr Tensile |
| --- | --- | --- | --- | --- |

| Sample No. | % by wt of composition | Sample, gals | lb/gal | Time to 70 Bc, hrs:mins | Strength @ 140° F., psi | Stength @ 140° F., psi | Permeability, md |
| --- | --- | --- | --- | --- | --- | --- | --- |
| 1 | 0 | 0 | 12 | 2:54 | 15,390 | 1.262 | 0 |
| 2 | 2 | 1:11 | 11 | 3:12 | 11,120 | 1,122 | 0 |
| 3 | 5 | 2:49 | 10.5 | — | 5,740 | 1,011 | 0 |
| 4 | 6 | 2:99 | 10 | — | 5.390 | 849 | 0 |
| 5 | 10 | 4.98 | 9 | — | 5,070 | 806 | 0.01 |

From the test results set forth in the Table it can be seen that the presence of the fluorocarbon surfactant foaming agent does not adversely affect the thickening time or other properties of the foamed epoxy resin composition, and that the composition can be foamed to a density as low as 9 pounds/gallon while retaining sufficient strength after hardening.

Thus, the present invention is well adapted to carry out the objects and advantages mentioned as well as those which are inherent therein. While numerous changes may be made to the invention by those skilled in the art, such changes are encompassed within the spirit of the invention as defined by the appended claims.

What is claimed is:

1. A foamed resin composition comprising:
   a liquid epoxy resin;
   an effective amount of a fluorocarbon surfactant foaming agent to produce a foam; and
   a gas present in an amount sufficient to foam said composition.

2. The composition of claim 1 wherein said epoxy resin comprises a condensation reaction product of epichlorohydrin and bisphenol A.

3. The composition of claim 1 wherein said epoxy resin has a molecular weight in the range of from about 200 to about 1000 and a one gram equivalent of epoxide per about 100 to about 200 grams of said epoxy resin.

4. The composition of claim 1 wherein said fluorocarbon surfactant foaming agent is selected from the group of fluorinated alkyl alkoxylates, fluorinated alkyl esters and fluorinated aliphatic polymeric esters.

5. The composition of claim 1 wherein said fluorocarbon surfactant foaming agent is a fluorinated aliphatic polymeric ester and is present in said composition in the range of from about 1% to about 12% by weight of epoxy resin therein.

6. The composition of claim 1 wherein said composition further comprises a liquid diluent containing one or more aromatic hydrocarbons present in said composition in an amount in the range of from about 25% to about 50% by weight of epoxy resin therein.

7. The composition of claim 6 wherein said aromatic hydrocarbons are selected from the group of toluene, ethylbenzene, n-propylbenzene; isopropylbenzene, n-butylbenzene, isobutylbenzene, cyclohexylbenzene, n-hexylbenzene, xylene, diethylbenzene, 2-chloro-p-xylene, diisopropylbenzene, 2-nitro-p-xylene, cymene, durene, isodurene, trimethylbenzene, triethylbenzene, dibutylbenzene, penta-methylbenzene, 1-pentyl-3-ethylbenzene, p-pentyltoluene, 1-hexyl-3-isobutylbenzene, m-hexyltoluene, 1-heptyl-3-isopropylbenzene, p-heptyltoluene, 1-heptyl-3-ethylbenzene, 1-octyl-3-butylbenzene, 1-octyl-3-propylbenzene, p-octyltoluene, 1-nonyl-3-ethylbenzene, p-nonyltoluene, 1-dodecyl-3-ethylbenzene, p-isodecyltoluene, 1-decyl-3-isotridecylbenzene and mixtures thereof.

8. The composition of claim 1 wherein said composition further comprises a hydrocarbon diluent comprising one or more aromatic hydrocarbons having the formula $$C_6H_2(R)_4$$

wherein R is hydrogen or a straight or branched chain alkyl radical having from 1 to 3 carbon atoms with at least two of the Rs being alkyl radicals, said diluent being present in said composition in an amount in the range of from about 25% to about 50% by weight of epoxy resin therein.

9. The composition of claim 1 wherein said composition further comprises a plastic fixer selected from the group of N-β-aminoethyl-Γ-aminopropyl-trimethoxysilane, Γ-aminopropyltriethoxysilane and Γ-aminopropyltrimethoxysilane and is present in said composition in an amount in the range of from about 0.01% to about 5% by weight of epoxy resin therein.

10. The composition of claim 1 wherein said composition further comprises a hardening agent selected from the group of aliphatic amines, cycloaliphatic amines, imidazoles, tertiary amines, aromatic amines and carboxylic acid anhydrides and is present in said composition in an amount in the range of from about 25% to about 70% by weight of the epoxy resin therein.

11. The composition of claim 1 wherein said gas is selected from the group of air and nitrogen and is present in said composition in an amount sufficient to foam said composition and produce a density in the range of from about 6 to about 16 pounds per gallon.

12. The composition of claim 1 wherein said composition further comprises a filler.

13. The composition of claim 12 wherein said filler is selected from the group of crystalline silica having a particle size in the range of from about 10 to about 20 microns, barite, calcium carbonate amorphous silica and iron oxide having a particle size in the range of from about 2 to about 4 microns present in said composition in an amount in the range of from about 10% to about 200% by weight of epoxy resin therein.

14. A foamed resin composition for sealing a subterranean zone comprising:
   a liquid epoxy resin;
   an effective amount of a fluorocarbon surfactant foaming agent selected from the group of fluorinated alkyl alkoxylates, fluorinated alkyl esters and fluorinated aliphatic polymeric esters to produce a foam; and
   a gas is present in said composition in an amount sufficient to foam said composition and produce a density in the range of from about 6 to about 16 pounds per gallon.

15. The composition of claim 14 wherein said epoxy resin comprises a condensation reaction product of epichlorohydrin and bisphenol A.

16. The composition of claim 14 wherein said epoxy resin has a molecular weight in the range of from about 200 to about 1000 and a one gram equivalent of epoxide per about 100 to about 200 grams of said epoxy resin.

17. The composition of claim 14 wherein said fluorocarbon surfactant foaming agent is a fluorinated aliphatic polymeric ester and is present in said composition in the range of from about 1% to about 12% by weight of epoxy resin therein.

18. The composition of claim 14 wherein said composition further comprises a liquid diluent containing one or more aromatic hydrocarbons present in said composition in an amount in the range of from about 25% to about 50% by weight of epoxy resin therein.

19. The composition of claim 14 wherein said composition further comprises a plastic fixer selected from the group of N-β-aminoethyl-Γ-aminopropyl-trimethoxysilane, Γ-aminopropyltriethoxysilane and Γ-aminopropyltrimethoxysilane and is present in said composition in an amount in the range of from about 0.01% to about 5% by weight of epoxy resin therein.

20. The composition of claim 14 wherein said composition further comprises a hardening agent selected from the group of aliphatic amines, cycloaliphatic amines, imidazoles, tertiary amines, aromatic amines and carboxylic acid anhydrides and is present in said composition in an amount in the range of from about 25% to about 70% by weight of the epoxy resin therein.

21. The composition of claim 14 wherein said composition further comprises a filler selected from the group of crystalline silica having a particle size in the range of from about 10 to about 20 microns, barite, calcium carbonate amorphous silica and iron oxide having a particle size in the range of from about 2 to about 4 microns present in said composition in an amount in the range of from about 10% to about 200% by weight of epoxy resin therein.

22. An improved hardenable corrosion resistant sealing composition having elasticity and ductility comprising:

a liquid epoxy resin comprised of the condensation reaction product of epichlorohydrin and bisphenol A;

a hydrocarbon diluent comprising one or more aromatic hydrocarbons having the formula

wherein R is hydrogen or a straight or branched chain alkyl radical having from 1 to 3 carbon atoms with at least two of the Rs being alkyl radicals, said diluent being present in an amount in the range of from about 25% to about 50% by weight of epoxy resin in said composition;

a plastic fixer selected from the group of N-β-aminoethyl-Γ-aminopropyltrimethoxysilane, Γ-aminopropyltriethoxysilane and Γ-aminopropyltrimethoxysilane present in an amount in the range of from about 0.01% to about 5% by weight of epoxy resin in said composition;

a hardening agent selected from the group of aliphatic amines, cycloalpiphatic amines, imidazoles, tertiary amines, aromatic amines and carboxylic acid anhydrides present in an amount in the range of from about 25% to about 70% by weight of the epoxy resin in said composition;

an effective amount of a fluorocarbon surfactant foaming agent selected from the group of fluorinated alkyl alkoxylates, fluorinated alkyl esters and fluorinated aliphatic polymeric esters to produce a foam; and a compressible gas present in an amount sufficient to foam said composition and produce a density in the range of from about 6 to about 16 pounds per gallon.

23. The composition of claim 22 wherein said epoxy resin has a molecular weight of about 340, a one gram equivalent of epoxide per about 185 to 192 grams of resin and a viscosity at 25° C. of about 100 to 160 poises.

24. The composition of claim 22 wherein said hydrocarbon diluent comprises from about 50% to about 99% of said aromatic hydrocarbons and is present in said composition in an amount of about 27% by weight of epoxy resin therein.

25. The composition of claim 22 wherein said plastic fixer is N-β-aminoethyl-Γ-aminopropyltrimethoxysilane present in said composition in an amount of about 0.65% by weight of epoxy resin therein.

26. The composition of claim 22 wherein said hardening agent is 2-ethyl-4-methyl imidazole present in said composition in an amount of about 58% by weight of epoxy resin therein.

27. The composition of claim 22 wherein said fluorocarbon surfactant foaming agent comprises a fluorinated aliphatic polymeric ester present in said composition in an amount in the range of from about 1% to about 12% by weight of epoxy resin therein.

28. The composition of claim 22 wherein said composition further comprises a filler selected from the group of crystalline silica having a particle size in the range of from about 10 to about 20 microns and iron oxide having a particle size in the range of from about 2 to about 4 microns and is present in said composition in an amount in the range of from about 10% to about 200% by weight of epoxy resin therein.

* * * * *